United States Patent
Kawanishi et al.

(10) Patent No.: US 11,565,508 B2
(45) Date of Patent: Jan. 31, 2023

(54) MOISTURE BARRIER LAMINATE

(71) Applicant: TOYO SEIKAN GROUP HOLDINGS, LTD., Tokyo (JP)

(72) Inventors: Misato Kawanishi, Yokohama (JP); Shunya Nangou, Yokohama (JP); Shinpei Okuyama, Yokohama (JP); Keisuke Takayama, Yokohama (JP); Yoshihiro Ohta, Yokohama (JP)

(73) Assignee: TOYO SEIKAN GROUP HOLDINGS, LTD., Tokyo (JP)

( * ) Notice: Subject to any disclaimer, the term of this patent is extended or adjusted under 35 U.S.C. 154(b) by 0 days.

(21) Appl. No.: 17/042,680

(22) PCT Filed: Mar. 29, 2019

(86) PCT No.: PCT/JP2019/014121
§ 371 (c)(1),
(2) Date: Sep. 28, 2020

(87) PCT Pub. No.: WO2019/189805
PCT Pub. Date: Oct. 3, 2019

(65) Prior Publication Data
US 2021/0122147 A1 Apr. 29, 2021

(30) Foreign Application Priority Data
Mar. 29, 2018 (JP) .............................. JP2018-065053

(51) Int. Cl.
*B32B 27/08* (2006.01)
*B32B 7/02* (2019.01)
(Continued)

(52) U.S. Cl.
CPC ................ *B32B 27/08* (2013.01); *B32B 7/02* (2013.01); *B32B 27/20* (2013.01); *B32B 27/306* (2013.01);
(Continued)

(58) Field of Classification Search
CPC .......... B32B 7/00–14; B32B 27/00–42; H01L 51/5253–5259
See application file for complete search history.

(56) References Cited

U.S. PATENT DOCUMENTS 5,618,872 A * 4/1997 Pohl ........................ C01B 33/18
524/430
9,956,748 B2 5/2018 Okuyama et al.
(Continued)

FOREIGN PATENT DOCUMENTS

JP 2000-255579 A 9/2000
JP 2011-194653 A 10/2011
(Continued)

OTHER PUBLICATIONS

International Search Report for PCT/JP2019/014121, dated May 21, 2019.
(Continued)

*Primary Examiner* — Prashant J Khatri
(74) *Attorney, Agent, or Firm* — Sughrue Mion, PLLC

(57) ABSTRACT

An object of the present invention is to provide a moisture barrier laminate including a moisture trapping layer that maximizes its moisture trapping performance and exhibits an excellent moisture barrier property. The moisture barrier laminate of the present invention includes a gas barrier film substrate A having a gas barrier layer a1 and a moisture trapping layer B formed on the film substrate A as a base. On
(Continued)

a surface of the moisture trapping layer B opposite to the film substrate A, a protective resin layer C having a moisture permeability in a range of $4.0\times10$ to $5.0\times10^4$ g/m²·day at 40° C. and 90% RH is laminated.

13 Claims, 1 Drawing Sheet

(51) Int. Cl.
    *B32B 27/20*     (2006.01)
    *B32B 27/30*     (2006.01)
    *B32B 27/40*     (2006.01)

(52) U.S. Cl.
    CPC ............ *B32B 27/308* (2013.01); *B32B 27/40* (2013.01); *B32B 2250/03* (2013.01); *B32B 2250/24* (2013.01); *B32B 2264/1021* (2020.08); *B32B 2264/1022* (2020.08); *B32B 2264/1023* (2020.08); *B32B 2264/1024* (2020.08); *B32B 2307/302* (2013.01); *B32B 2307/412* (2013.01); *B32B 2307/7244* (2013.01); *B32B 2307/7246* (2013.01); *B32B 2307/732* (2013.01); *B32B 2333/08* (2013.01); *B32B 2367/00* (2013.01); *B32B 2375/00* (2013.01); *B32B 2457/206* (2013.01); *B32B 2457/208* (2013.01)

(56) References Cited

U.S. PATENT DOCUMENTS

2017/0226625 A1*   8/2017   Kawahara ............... C08J 7/0423
2018/0236757 A1*   8/2018   Nangou .................. C23C 14/24

FOREIGN PATENT DOCUMENTS

| JP | 2012-250470 A | 12/2012 | |
|---|---|---|---|
| JP | 2015-96320 A | 5/2015 | |
| JP | 2017-035829 A | 2/2017 | |
| WO | 2014/083899 A1 | 6/2014 | |
| WO | WO-2016021459 A1 * | 2/2016 | ............... B32B 9/00 |
| WO | WO-2017030047 A1 * | 2/2017 | ............. B32B 27/08 |

OTHER PUBLICATIONS

Extended European Search Report (EESR) dated Nov. 17, 2021, in corresponding European Application No. 19774667.0.

* cited by examiner

MOISTURE BARRIER LAMINATE

CROSS REFERENCE TO RELATED APPLICATIONS

This application is a National Stage of International Application No. PCT/JP2019/014121 filed Mar. 29, 2019, claiming priority based on Japanese Patent Application No. 2018-065053 filed Mar. 29, 2018.

TECHNICAL FIELD

The present invention relates to a moisture barrier laminate provided with a moisture trapping layer.

BACKGROUND ART

In recent years, various electronic devices have been developed and put into practical use, and the examples include organic electroluminescence (organic EL) devices, solar cells, touch panels, and electronic papers. These devices are required to have a high-level moisture barrier property in order to avoid disadvantages such as charge leakage caused by moisture.

It has been known to form an inorganic thin film (inorganic barrier layer) by vapor deposition on a surface of a plastic substrate in order to improve the characteristics, in particular, the gas barrier property, of the plastic substrate (Patent Document 1). Films that comprise the inorganic thin film are used in a wide variety of fields. However, the barrier films are insufficient to satisfy the moisture barrier property required for the electronic device, and residual moisture in the resin used for the plastic substrate significantly deteriorates the device.

In order to satisfy such a demand, the present applicant has proposed a moisture barrier laminate having a structure in which a moisture trapping layer containing a hygroscopic ionic polymer as a matrix is laminated (Patent Document 2).

The moisture trapping layer is formed by applying a coating composition for forming a trapping layer containing an ionic polymer on an inorganic barrier layer formed on a surface of a plastic film by vapor deposition or the like and curing the coating composition. Formation of the layer imparts an excellent moisture barrier property.

However, even by using a barrier film provided with a moisture trapping layer having a high moisture trap performance, the moisture barrier property is not always sufficiently exhibited.

PRIOR ART DOCUMENTS

Patent Documents

[Patent Document 1] JP-A-2000-255579
[Patent Document 2] JP-A-2015-96320

SUMMARY OF THE INVENTION

Problems to be Solved by the Invention

Accordingly, it is an object of the present invention to provide a moisture barrier laminate comprising a moisture trapping layer that exhibits maximal moisture trap performance, thereby providing an excellent a moisture barrier property.

Means for Solving the Problems

The present invention provides a moisture barrier laminate comprising: a gas barrier film substrate A having a gas barrier layer, and a moisture trapping layer B formed on the film substrate A. A protective resin layer C having a moisture permeability in a range of $4.0 \times 10$ to $5.0 \times 10^4$ g/m$^2$/day at 40° C. 90% RH is laminated on a surface of the moisture trapping layer B opposite to the film substrate A.

It is preferable in the moisture barrier laminate of the present invention that:

(1) the moisture trapping layer B keeps a water content of not more than 0.15 g/g in a measurement at 230° C. in accordance with JIS-7251;
(2) the moisture trapping layer B contains a hygroscopic polymer;
(3) the moisture trapping layer B comprises a hygroscopic matrix of an ionic polymer in which a moisture absorbent having an ultimate humidity lower than that of the matrix is dispersed;
(4) the ionic polymer contained in the moisture trapping layer B is a cationic polymer;
(5) the protective resin layer C is formed of an acrylic resin, a urethane resin or a polyester resin;
(6) the protective resin layer C has a thickness in a range of 0.1 to 15 µm;
(7) the protective resin layer C comprises a particulate metal oxide blended as a refractive index modifier;
(8) the metal oxide is silica, alumina, titania or zirconia; and
(9) a transparent conductive film is provided on the protective resin layer C.

Effect of the Invention

The moisture barrier laminate of the present invention has a basic structure that the moisture trapping layer B is formed on the gas barrier film substrate A having the gas barrier layer. A remarkable characteristic of the moisture barrier laminate of the present invention is that the protective resin layer C having a moisture permeability in the range of $4.0 \times 10$ to $5.0 \times 10^4$ g/m$^2$/day is laminated on the moisture trapping layer. Lamination of the protective resin layer C having the moisture permeability serves to effectively prevent moisture absorption by the moisture trapping layer in the process of producing the moisture barrier laminate. As a result, the moisture barrier laminate can be used in a state where the moisture trapping layer is kept in a dry state, and the moisture barrier property imparted by the moisture trapping layer can be exhibited to the maximum.

It is required that the moisture trapping layer B formed on the gas barrier film substrate A is subjected to a drying treatment so as to release the moisture absorbed in the moisture trapping layer B. If the moisture trapping layer B contains more moisture, the water content in the moisture trapping layer B can be saturated in a shorter time to impair the moisture trapping property.

For instance, in Patent Document 2 proposed by the applicant, a film (X) in which a plastic base material, a first inorganic barrier layer and a moisture trap layer are laminated in this order and a barrier film (Y) in which organic layer and a second inorganic barrier are laminated. At this time, the moisture trap layer and the organic layer face each other. In the laminate having this structure, the treatment for drying the moisture trapping layer is performed before lamination on the barrier film having the second inorganic barrier layer. If the drying treatment is performed after lamination of the barrier film, the moisture trapping layer is actually sandwiched by two inorganic barrier layers, and the moisture absorbed in the moisture trapping layer cannot be released.

For drying the moisture trapping layer, a desiccant sheet including a desiccant dispersed therein is stuck onto the moisture trapping layer and the moisture trapping layer is introduced into a heated dry atmosphere. If the moisture trapping layer is dried without sticking the desiccant sheet thereon, moisture released from the moisture trapping layer is re-absorbed by the moisture trapping layer. The stuck desiccant sheet prevents the re-absorption of moisture by the moisture trapping layer. Further, the desiccant sheet imparts a desiccant effect to increase the drying efficiency.

The moisture trapping layer subjected to the drying treatment in this way is wound in a roll and stored as required. In use, the film is unwound from the roll, and the barrier film having the second inorganic barrier layer is laminated while peeling off the desiccant sheet.

The moisture trapping layer is dried in this manner and the barrier film is laminated. The inventors have found that the moisture trapping layer absorbs moisture in a short time from peeling of the desiccant sheet to the lamination of the barrier film, and the moisture absorption causes degradation in the performance of the moisture trapping layer. The moisture absorption in a short time is greater if the moisture trapping layer has higher performance, and thus, the performance may be degraded significantly.

For instance, when the dried moisture trapping layer is exposed to an environment of 23° C. and 40% RH, the water content of this moisture trapping layer increases in 30 seconds by about 0.15 g per 1 g of the trapping layer. Therefore, in order to prevent moisture absorption of the moisture trapping layer after peeling off the desiccant sheet, it is only necessary to increase the line speed and to laminate the barrier film immediately after the desiccant sheet is peeled off. However, there is a limit to the increase in line speed.

When a protective resin layer having a moisture permeability ranging from $4.0 \times 10$ to $5.0 \times 10^4$ g/m$^2$/day is formed on the moisture trapping layer in accordance with the present invention, the increase in water content after 30 seconds is reduced to about 0.10 g or less per 1 g of the trapping layer.

In other words, since the protective resin layer C having an appropriate moisture permeability is provided beforehand in the present invention, moisture absorption of the moisture trapping layer after peeling the desiccant sheet can be effectively prevented, and degradation in performance of the moisture trapping layer can be effectively avoided.

When the protective resin layer C of the present invention has a lower moisture permeability, the moisture absorption preventing effect of the moisture trapping layer B is improved. However, when this moisture permeability becomes excessively low, release of the absorbed moisture from the moisture trapping layer is restricted at the time of drying the moisture trapping layer, and the desiccant effect of the moisture trapping layer is degraded. For preventing these disadvantages, the moisture permeability of the protective resin layer C is set within a predetermined range in the present invention.

MODE FOR CARRYING OUT THE INVENTION

Figure 1:
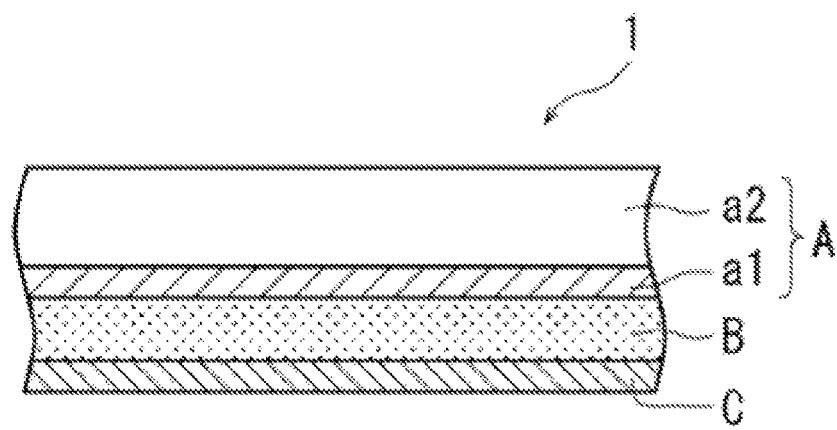
FIG. 1: a schematic side cross-sectional view showing an example of a layer structure of a moisture barrier laminate of the present invention.

FIG. 1 shows an example of a moisture barrier laminate 1 of the present invention. This laminate comprises a gas barrier film substrate A. A moisture trapping layer B formed on the film substrate A, and a protective resin layer C is provided on a surface of the moisture trapping layer B opposite to the film substrate A.

The moisture barrier laminate 1 can be used in a state attached to a device vulnerable to moisture intrusion. For instance, as shown in FIG. 1, the gas barrier film substrate A is located outside the device (in a high-humidity atmosphere), the protective resin layer C is located inside the device (low-humidity side) in use.

<Gas Barrier Film Substrate A>

The gas barrier film substrate A is a film having a moisture permeability considerably lower in comparison with the protective resin layer C. The moisture permeability is for instance, not higher than 1.0 g/m$^2$/day at 40° C. and at a relative humidity of 90% (40° C. 90% RH).

The film substrate A may have a multilayer structure in which a layer of a gas barrier resin such as an ethylene-vinyl alcohol copolymer or an aromatic polyamide is provided as an intermediate layer between an inner/outer layer made of polyolefin, polyester or the like via an adhesive resin layer. Usually, it is preferred to have a structure shown in FIG. 1 where an inorganic barrier layer a1 is formed on a plastic substrate layer a2.

The inorganic barrier layer a1 is a layer formed on the plastic substrate layer a2, and it can be a known substrate in JP 2015-96320 or the like. From the viewpoint of imparting a high oxygen-barrier property, preferably it is an inorganic film formed of a metal or a metal oxide by vapor deposition such as physical vapor deposition like sputtering, vacuum deposition and ion plating or chemical vapor deposition like plasma CVD. Particularly preferably, it is formed by plasma CVD from the viewpoint of forming a homogeneous film even on an irregular surface and exhibiting an excellent barrier property not only to oxygen but moisture.

The vapor deposition film formed by the plasma CVD is obtained by: placing a plastic substrate a2 in a plasma chamber kept at a predetermined vacuum, where the plastic substrate a2 is in the form of film to make a base for the inorganic barrier layer a1; feeding a gas (reaction gas) of a metal or a compound containing the metal for film formation and an oxidizing gas (usually oxygen or NOx gas) appropriately together with a carrier gas such as argon and helium through a gas feeding pipe into the plasma chamber that is shielded with a metal wall and kept in a reduced pressure to have a predetermined vacuum; generating glow discharge in this state by a microwave electric field, a high frequency electric field or the like to generate plasma by the electric energy, thereby depositing decomposition products of the compound on the surface of the plastic substrate layer a2 so as to form a film.

As the reaction gas, it is usually preferred to use a gas of an organic metal compound, from the view point that a film having a flexible region containing a carbon component on the interface of the substrate layer a2 as a base, and a region having a high oxidation degree and an excellent barrier property can be formed on the surface. Examples of the organic metal compound include an organoaluminum compound like trialkylaluminum, an organotitanium compound, an organozirconium compound, and an organosilicon compound. In particular, an organosilicon compound is most preferred because an inorganic barrier layer a1 having a high barrier property against oxygen can be formed relatively easily and efficiently.

The thickness of the inorganic barrier layer a1 is determined such that a predetermined moisture permeability can be satisfied in accordance with the thickness of the plastic substrate layer a2 as a base. It is usually sufficient to have a thickness of 4 to 500 nm, particularly about 30 to about 400 nm.

The method for forming the inorganic barrier layer a1 on the plastic substrate layer a2 is not limited to vapor deposition or the like, but the formation can be carried out also by coating or the like. The inorganic barrier layer a1 formed by coating is inferior to an inorganic barrier layer formed by vapor deposition or the like in properties such as oxygen barrier property. Nevertheless, when a high barrier property against oxygen and the like is not required, the inorganic barrier layer a1 may be formed by coating.

The inorganic barrier layer a1 is formed in the following manner. Specifically, a solution of an organic solvent containing film formation components is prepared. Examples of the components include polysilazane, a polycondensable silane compound (e.g., alkoxysilane or the like), and a polycondensable alumina compound (e.g., alkoxyaluminum or the like). In the solution, inorganic fine particles such as silica or alumina are suitably mixed. This solution is coated on a predetermined surface, heated to volatilize the organic solvent, so as to form the inorganic barrier layer a1.

As described above, the plastic substrate layer a2 serves as the base for the inorganic barrier layer a1. It is usually formed of a thermoplastic or thermosetting resin by any process selected depending on its shape, such as injection or co-injection molding, extrusion or co-extrusion molding, film/sheet molding, compression molding and cast-polymerization.

In general, a thermoplastic resin is suitable from the viewpoint of moldability, the cost and the like.

Examples of the thermoplastic resins include: polyolefins such as low density polyethylene, high density polyethylene, polypropylene, poly1-butene, poly 4-methyl-1-pentene or random or block copolymers of α-olefins (such as ethylene, propylene, 1-butene, or 4-methyl-1-pentene);

cyclic olefin resins such as cyclic olefin copolymers and cyclic olefin polymers;

ethylene-vinyl compound copolymers such as an ethylene-vinyl acetate copolymer, an ethylene-vinyl alcohol copolymer, and an ethylene-vinyl chloride copolymer;

styrene-based copolymers such as polystyrene, acrylonitrile-styrene copolymers, ABS, and α-methylstyrene-styrene copolymers;

polyvinyl compounds such as polyvinyl chloride, polyvinylidene chloride, a vinyl chloride-vinylidene chloride copolymer, polymethyl acrylate, and methyl methacrylate;

polyamides such as nylon 6, nylon 6-6, nylon 6-10, nylon 11, and nylon 12;

thermoplastic polyesters such as polyethylene terephthalate (PET), polybutylene terephthalate, and polyethylene naphthalate (PEN);

polycarbonate;

polyphenylene oxide;

other polyimide resins, polyamideimide resins, polyetherimide resins, fluororesins, allyl resins, polyurethane resins, cellulose resins, polysulfone resins, polyether sulfone resins, ketone resins, amino resins, or biodegradable resins (e.g., polylactic acid).

Further, blends of these substances or resins suitably modified by copolymerization (e.g., an acid-modified olefin resin or the like) may be used.

The plastic substrate layer a2 may be formed of a gas barrier resin or the like having an excellent oxygen barrier property, and an example thereof is an ethylene-vinyl alcohol copolymer. This layer a2 may have a multilayer structure including a layer formed of such a gas barrier resin. In other words, the aforementioned inorganic barrier layer a1 can be formed on the plastic substrate layer a2 containing such a gas barrier resin.

In the present invention, it is more suitable to use a substrate layer 5 of a film of a polyester resin such as polyethylene terephthalate (PET), polybutylene terephthalate or polyethylene naphthalate, or a cyclic olefin-based resin such as a polyimide resin, acyclic olefin copolymer or acyclic olefin polymer, since these resins are favorable from the viewpoint of availability, cost performance and moldability. In addition, the resins exhibit certain barrier properties against oxygen or moisture, and further they can be used suitably as a base for the inorganic barrier layer a1 mentioned below.

Although there is no particular limitation on the thickness of the plastic substrate layer a2, excessive thickness thereof may increase the moisture permeability of this film substrate A, thereby making it difficult to satisfy the aforementioned moisture permeability. In addition to that, since the film substrate A may lose its flexibility. Taking these into consideration, the thickness of this substrate layer a1 is usually set to 200 μm or less, more preferably 125 μm or less so that the moisture permeability of the barrier film 1 is kept within the range described above.

A moisture trapping layer B described below is formed on such a gas barrier film substrate A.

In the example shown in FIG. 1, the moisture trapping layer B is formed on the inorganic barrier layer a1. It is also possible to form the moisture trapping layer B on the plastic substrate layer a2 though it is desirable to form the moisture trapping layer B on the inorganic barrier layer a1 from the viewpoint of preventing the inorganic barrier layer a1 from being scratched, for instance.

<Moisture Trapping Layer B>

In the present invention, the moisture trapping layer B blocks a moisture flow in the thickness direction of the gas barrier film substrate A. This moisture trapping layer B is provided when there is a necessity to impart a moisture barrier property.

There is no particular limitation on this moisture trapping layer B as long as the layer exhibits a moisture blocking property, and it may be a layer known per se, such as a layer prepared by dispersing a moisture absorbent like zeolite in a predetermined resin layer. Sometimes, however, a particularly high barrier property against moisture may be required. For instance, it is required to impart a moisture permeability of, $10^{-5}$ g/m$^2$/day or less, or even $10^{-6}$ g/m$^2$/day or less (23° C., RH50%). For this purpose, it is preferable to form the moisture trapping layer B using the ionic polymer disclosed in JP-A-2015-96320 and the like, and further, it is preferable to form the moisture trapping layer B by using the ionic polymer as a matrix and dispersing a moisture absorbent having a ultimate humidity lower than that of the ionic polymer in the matrix. The ionic polymer applied as a matrix has an excellent moisture capturing property. Further, a moisture absorbent having a lower ultimate humidity dispersed therein can effectively avoid deformation such as swelling caused by moisture absorption.

Ionic polymers suitably used for forming the moisture trapping layer B include cationic polymers and anionic polymers.

The cationic polymer used here is obtained by polymerizing or copolymerizing at least one cationic monomer suitably with any other copolymerizable monomer, and further neutralizing partially by an acid treatment as required. Examples of the cationic monomers include: amine-based monomers such as allylamine, ethyleneimine, vinylbenzyltrimethylamine, [4-(4-vinylphenyl)-methyl]-trimethylamine, and vinylbenzyltriethylamine; nitrogen-containing heterocyclic monomers such as vinylpyridine and vinylimidazole; and salts thereof.

Since such cationic polymers are described in detail in JP 2015-96320 and the like, details thereof are omitted here. Usually, polyallylamine is preferred from the viewpoint of film formability and the like.

The anionic polymer used here is obtained by polymerizing or copolymerizing at least one anionic monomer suitably with any other copolymerizable monomer, and further neutralizing partially by an alkali treatment as required. Examples of the anionic monomers include: carboxylic acid monomers such as methacrylic acid, acrylic acid, and maleic anhydride; sulfonic acid-based monomers such as α-halogenated vinyl sulfonic acid, styrenesulfonic acid, and vinylsulfonic acid; phosphonic acid-based monomers such as vinylphosphoric acid; and salts thereof.

Since such anionic polymers are described in detail in JP 2015-96320 and the like, details thereof are omitted here. Usually, a poly(meth)acrylic acid and a partially neutralized product thereof (for instance, a part thereof is a Na salt) may be used.

Some moisture absorbents can prevent suitably deformation caused by swelling when being blended in the ionic polymer. That is, the moisture absorbent has an ultimate humidity lower than that of the ionic polymer. Examples of the moisture absorbent have the ultimate humidity of 6% or less under an environmental condition of 80% RH and a temperature of 30° C. That is, when the ultimate humidity of this moisture absorbent is higher than that of the ionic polymer, the confinement of moisture absorbed in the matrix is not sufficient, and the release of moisture and the like tends to occur. When a moisture absorbent having an ultimate humidity lower than that of the ionic polymer is blended in the ionic polymer, moisture can be effectively trapped even in a low humidity atmosphere. Furthermore, since the moisture absorbed in the ionic polymer can be captured by the moisture absorbent, release of the moisture can be prevented or decreased, thereby exhibiting a high moisture barrier property.

The moisture absorbent as described above usually has a water absorption rate (JIS K-7209-1984) of 20% or more at a humidity of 80% RH and a temperature of 30° C., and it can be selected from inorganic agents and organic agents.

Examples of the inorganic moisture absorbent include: zeolite, alumina, activated carbon, clay minerals such as montmorillonite, silica gel, calcium oxide, and magnesium sulfate.

Examples of the organic moisture absorbent include a crosslinked product of an anionic polymer or a partially neutralized product thereof. The anionic polymer can be obtained by polymerizing at least one of anionic monomers represented by carboxylic acid monomers (such as (meth) acrylic acid and maleic anhydride), sulfonic acid monomers (such as halogenated vinyl sulfonic acid, styrene sulfonic acid and vinyl sulfonic acid), phosphonic acid monomers (such as vinyl phosphate) and salts of these monomers; or copolymerizing these monomers with any other monomers. In applications where transparency is particularly required, an organic moisture absorbent is effective. For instance, fine particles of crosslinked poly(meth)acrylic acid Na and the like are representative organic moisture absorbents.

Among these moisture absorbents, a moisture absorbent having a small particle diameter is preferred because the moisture absorbent exhibits high hygroscopicity due to its large specific surface area (e.g., its average primary particle diameter is 100 nm or less, particularly 80 nm or less). A moisture absorbent of an organic polymer having a small particle diameter is particularly preferred.

In other words, the moisture absorbent of the organic polymer has an extremely preferable dispersibility in the matrix of the ionic polymer, and it can be homogeneously dispersed. In addition, since emulsion polymerization, suspension polymerization or the like can be employed as a polymerization method for producing the same, the particles can be shaped into fine and uniform spheres. By blending the particles of at least a predetermined amount, extremely high transparency can be imparted.

Further the moisture absorbent of an organic polymer of fine particles has an extremely low ultimate humidity, and thus, it exhibits high hygroscopicity. In addition, its crosslinking serves to decrease the volume change caused by swelling. The moisture absorbent is used most suitably to lower the humidity in the environmental atmosphere to the absolute dry state or close to the absolute dry state, while controlling the volume change.

As fine particles of the organic moisture absorbent, for instance, crosslinked polyacrylic acid Na fine particles (average particle diameter: about 70 nm) are commercially available in the form of colloidal dispersions (pH=10.4) from Toyobo Co., Ltd. under the trade name TAFTIC HU-820E.

In the present invention, the amount of the moisture absorbent is set according to the type of the ionic polymer for the purpose of sufficiently exhibiting its characteristics, improving remarkably the moisture barrier property, effectively preventing a dimensional change caused by swelling, and at the same time, maintaining the moisture barrier property higher than the barrier property exhibited by the inorganic barrier layer a1 over a long period of time.

For instance, when the moisture absorbent is dispersed in a cationic polymer to form a moisture trapping layer B, usually it is preferable that the moisture absorbent is present in an amount of 50 parts by mass or more, particularly 100 to 900 parts by mass, per 100 parts by mass of the cationic polymer, and more preferably in an amount of 200 to 600 parts by mass. When the moisture absorbent is dispersed in the anionic polymer, it is preferably present in an amount of 50 parts by weight or more, particularly 100 to 1300 parts by weight, per 100 parts by weight of the anionic polymer, and more preferably in an amount of 150 to 1200 parts by weight.

In the moisture trapping layer B formed of the ionic polymer, it is preferable that a crosslinked structure is introduced into the ionic polymer. In other words, when the ionic polymer with the introduced crosslinked structure absorbs water, molecules of the ionic polymer are restrained from each other due to the crosslinking, and this prevents or decreases the volume change caused by swelling (moisture absorption), thereby improving the mechanical strength and the dimensional stability.

The crosslinked structure can be introduced by blending a crosslinking agent in a coating composition for forming a moisture trapping layer B. Unlike the case of cationic polymer, the anionic polymer is supplied with water by only hydrogen bond. As a result, the hygroscopicity can be greatly enhanced by introducing a mesh structure (crosslinked structure) of spaces suitable for hygroscopicity into a matrix.

The crosslinking agent for introducing such a crosslinked structure is slightly different between a case where the crosslinked structure is introduced into a cationic polymer and a case where the crosslinked structure is introduced into an anionic polymer.

As a crosslinking agent for a cationic polymer, for instance, a compound as described in JP 2015-96320 can be used. The compound has a crosslinkable functional group (e.g., an epoxy group) capable of reacting with a cationic group and a functional group (e.g., an alkosylyl group) capable of forming a siloxane structure in a crosslinked structure through hydrolysis and dehydration condensation. Specifically, a silane compound represented by the following formula (1) is suitably used.

$$X\text{—}SiR^1_n(OR^2)_{3-n} \quad (1)$$

In the formula, X is an organic group having an epoxy group at the terminal. $R^1$ and $R^2$ are each a methyl group, an ethyl group, or an isopropyl group, and n is 0, 1, or 2.

In the silane compound, a representative example of the organic group X having an epoxy group in the formula (1) is a γ-glycidoxyalkyl group, and for instance, γ-glycidoxypropyltrimethoxysilane or γ-glycidoxypropylmethyldimethoxysilane is suitably used as the crosslinking agent.

An crosslinking agent including the epoxy group in the formula (1) is also used favorably, and the epoxy group used suitably is an alicyclic epoxy group such as an epoxycyclohexyl group. For instance, when a compound having an alicyclic epoxy group such as β-(3,4-epoxycyclohexyl) ethyltrimethoxysilane is used as the crosslinking agent, an alicyclic structure is introduced into the crosslinked structure of the matrix together with the siloxane structure. The introduction of alicyclic structure can further effectively exhibit the function of the matrix of forming a mesh structure of spaces suitable for moisture absorption.

In order to introduce an alicyclic structure into the crosslinked structure, a compound having a plurality of epoxy groups and an alicyclic group, for instance, a diglycidyl ester represented by formula (2) can be used as a crosslinking agent.

$$G\text{-}O(C\!\!=\!\!O)\text{-}A\text{-}(C\!\!=\!\!O)O\text{-}G \quad (2)$$

In the formula, G is a glycidyl group, A is a divalent hydrocarbon group having an aliphatic ring, for instance, cycloalkylene group.

A representative example of the diglycidyl ester is represented by the following formula (2-1).

[Chemical Formula 1]

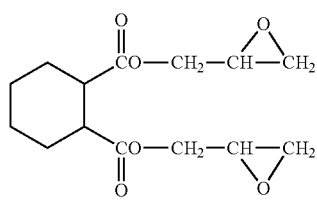

(2-1)

The diglycidyl ester of formula (2) having no alkoxysilyl group is effective in forming a mesh structure of spaces suitable for moisture absorption in the matrix because an alicyclic structure is introduced into the crosslinked structure.

It is desirable that the crosslinking agent described above is used in an amount of 5 to 60 parts by weight, particularly 15 to 50 parts by weight, per 100 parts by weight of the cationic polymer, and it is desirable that at least 70% by weight, preferably at least 80% by weight of the crosslinking agent is the silane compound represented by the formula (1).

As a crosslinking agent for introducing a crosslinked structure into an anionic polymer, a compound having two or more crosslinkable functional groups (e.g., epoxy groups) capable of reacting with an ionic group possessed by the anionic polymer can be used as described in JP 2015-96320A or the like. Preferably, diglycigyl ester represented by formula (2) that is also applicable to the coating composition for a cationic matrix can be used.

$$G\text{-}O(C\!\!=\!\!O)\text{-}A\text{-}(C\!\!=\!\!O)O\text{-}G \quad (2)$$

In the formula, G is a glycidyl group, and A is a divalent hydrocarbon group having an aliphatic ring, for instance cycloalkylene.

In other words, in the diglycidyl ester represented by the formula (2), an epoxy group reacts with an anionic group, and a crosslinked structure containing an alicyclic structure by a divalent group A is formed in the matrix. This crosslinked structure containing the alicyclic structure may prevent or reduce the swelling.

Among the aforementioned diglycidyl esters, the diglycidyl ester represented by the formula (2-1) is the most suitable since it can form a mesh structure of spaces suitable for moisture absorption.

It is desirable to use the crosslinking agent for an anionic polymer in an amount of 1 to 50 parts by weight, particularly 10 to 40 parts by weight, per 100 parts by weight of the anionic polymer.

In the present invention, the moisture trapping layer B can be formed by: preparing a coating composition formed by dissolving or dispersing in an organic solvent a predetermined hygroscopic polymer or moisture absorbent; applying the coating composition on the surface of the gas barrier film substrate A, more specifically on the surface of the inorganic barrier layer a1, and heating to remove the organic solvent.

In the present invention, it is preferable to keep the water content of the moisture trapping layer (230° C., in accordance with JIS-7251) to be 0.15 g/g or less, in particular to be 0.1 g/g or less, by providing the protective resin layer C described below. In this manner, the moisture trapping layer B can sufficiently exhibit its performance so as to maintain the excellent moisture barrier property.

<Protective Resin Layer C>

In the present invention, a protective resin layer C is provided on the moisture trapping layer B formed in the above-described manner.

As described above, the protective resin layer C is required to have moisture permeability at 40° C. and at a relative humidity of 90% in the range of $4.0\times10$ to $5.0\times10^4$ g/m²/day, preferably in the range of $4.0\times10^2$ to $3.0\times10^4$ g/m²/day. When this moisture permeability is larger than the above range, the moisture absorption rate after the desiccant sheet is peeled off is large, and this may make it difficult to set the water content of the moisture trapping layer B in the above range, for instance. When the moisture permeability is smaller than this range, release of the moisture from the moisture trapping layer B is considerably limited. As a result, the drying treatment cannot be efficiently performed.

Further in some cases, it may be impossible to release moisture from the moisture trapping layer B to set the water content within the range.

In order to maintain the moisture permeability as described above, the thickness of the protective layer C is determined such that a desired moisture permeability is obtained in accordance with the degree of moisture barrier property the resin used for forming the protective resin layer C possesses.

For instance, various plastic materials can be employed for forming the protective resin layer C. Usually, the protective resin layer may be formed of a thermoplastic resin since it can be formed easily by coating on the surface of the moisture trapping layer B. Since the protective resin layer C itself does not improve the moisture barrier property or the oxygen barrier property, the thickness is preferably for instance in the range of 0.1 to 15 μm, particularly about 0.3 to about 10 μm, from the viewpoint of productivity.

Therefore, a resin exhibiting appropriate moisture barrier property is preferably used as the resin for forming the protective resin layer C, since the moisture permeability can be maintained when the thickness of the layer is in the aforementioned range. Specifically, the protective layer C can be formed of: (meth)acrylic resins such as alkyl (meth) acrylate; polyester resins such as polyethylene terephthalate (PET), polybutylene terephthalate, and polyethylene naphthalate (PEN); a urethane resin; an epoxy resin; an olefinic resin; and a resin obtained by appropriately modifying these resins by copolymerization.

In the present invention, the protective resin layer C can be easily formed by preparing a coating liquid by dissolving the resin in a suitable volatile solvent, applying the coating liquid on a surface of the moisture trapping layer B, that is, a surface opposite to the surface on which the gas barrier film substrate A is provided, and heating the formed coating layer to volatilize the organic solvent.

<Drying Treatment>

In the present invention, after the protective layer C is formed on the moisture trapping layer B in the aforementioned manner, a drying treatment is performed to release the moisture contained in the moisture trapping layer B.

Such a drying treatment is usually performed appropriately by heating the obtained laminate 1 under reduced pressure. In the present invention, this drying treatment is performed in a state in which the desiccant sheet is stuck on the protective layer C. In other words, since the protective layer C exhibits appropriate moisture permeability, when the desiccant sheet is stuck on the protective layer C, the moisture contained in the moisture trapping layer B can be captured through the protective layer C, and the moisture content in the moisture trapping layer B can be efficiently and greatly reduced.

For instance, when drying is performed without sticking the desiccant sheet, moisture absorption by the moisture trapping layer B occurs during storage subsequent to the drying treatment, so that the performance of the moisture trapping layer B cannot be sufficiently exhibited in use. Further, when only the heat-drying is performed under a reduced pressure, a part of the moisture released from the moisture trapping layer B is trapped again by the moisture trapping layer B, making it difficult to set the water content of the moisture trapping layer B within the range described above.

As the desiccant sheet, a well-known sheet prepared by dispersing a desiccant such as silica gel in a resin can be used. It is preferable to use a desiccant sheet 10 having a structure shown in FIG. 2 in order to more reliably keep the moisture content within the above-described range.

Figure 2:
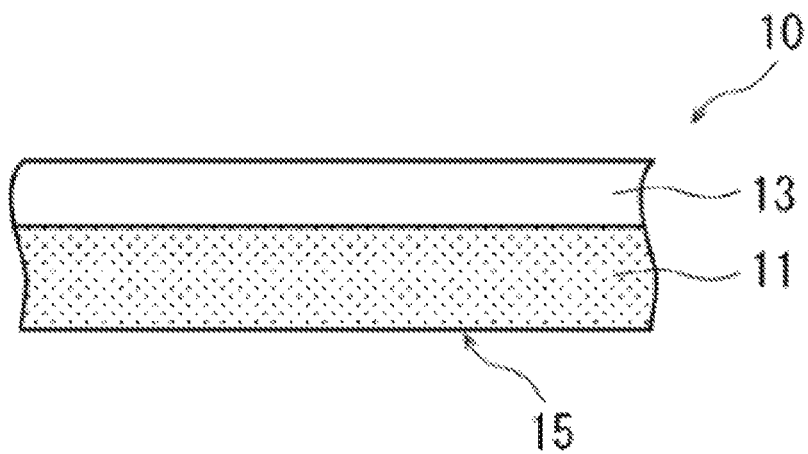
FIG. 2: a schematic side cross-sectional view showing an example of a desiccant sheet to be used for drying the moisture trapping layer B provided on the moisture barrier laminate shown in FIG. 1.

The desiccant sheet 10 in FIG. 2 has a hygroscopic resin layer 11 and a surface protective resin layer 13 provided on one surface of the hygroscopic resin layer 11. The other surface of the hygroscopic resin layer 11 (a surface on which the surface protective resin layer 13 is not provided) makes a hygroscopic functional surface 15, and this surface 15 is peelably stuck on the surface of the protective layer C.

In the desiccant sheet 10, the hygroscopic resin layer 11 is a resin layer in which a desiccant is dispersed. An inorganic or organic desiccant known per se can be used.

Examples of the inorganic desiccant include: zeolite, alumina, activated carbon, clay minerals such as montmorillonite, silica gel, calcium oxide, barium oxide, calcium chloride, and magnesium sulfate.

Examples of the organic desiccant include a crosslinked product of an anionic polymer or a partially neutralized product thereof. Examples of the anionic polymer can be obtained by polymerizing at least one of anionic monomers represented by carboxylic acid monomers (such as (meth) acrylic acid and maleic anhydride), sulfonic acid monomers (such as halogenated vinyl sulfonic acid, styrene sulfonic acid and vinyl sulfonic acid), phosphonic acid monomers (such as vinyl phosphate) and salts of these monomers; or copolymerizing these monomers with any other monomers.

In the present invention, a desiccant such as calcium oxide that exhibits chemisorption property due to reaction with water is used more favorably than a desiccant such as zeolite or silica gel that captures moisture by physical adsorption, since the moisture released from the moisture trapping layer B can be effectively captured.

The desiccant can be homogeneously dispersed in the resin. Preferably the particle size is small from the viewpoint of increasing the specific surface area. For instance, the average primary particle diameter (D50) in terms of volume measured by the laser diffraction scattering method is preferably 20 μm or less, and the desiccant is usually dispersed in the hygroscopic resin layer 11 in an amount of 5 to 80 parts by mass per 100 parts by mass of resin as a matrix.

There is no particular limitation on the resin as the matrix of the hygroscopic resin layer 11, and any known thermoplastic resins can be used. Usually, random or block copolymers of α-olefins or cyclic olefin copolymers of olefinic resins can be used preferably from the viewpoint of stickiness of the desiccant sheet to the surface protective resin layer 13 or to the protective resin layer C of the moisture barrier laminate, or from the viewpoint of cost or the like. Examples of the olefinic resins include low-density polyethylene, high-density polyethylene, polypropylene, poly1-butene, poly4-methyl-1-pentene or ethylene, propylene, 1-butene, and 4-methyl-1-pentene.

In the present invention, among these olefinic resins, low density polyethylene (LDPE), linear low density polyethylene (LLDPE), polypropylene (PP) and blends thereof are suitably used, since these resins have particularly low hygroscopicity to effectively prevent release of the moisture from the hygroscopic resin layer 11, and also prevent deactivation of the desiccant prior to use. Among them, low density polyethylene (LDPE) and linear low density polyethylene (LLDPE) are particularly preferred.

The surface protective resin layer 13 is a layer for preventing intrusion of the moisture from the atmosphere into the hygroscopic resin layer 11. In order to maintain the moisture barrier property, the moisture permeability at 40° C. and 90% RH is preferably 40 g/m$^2$/day or less, particularly preferably 20 g/m$^2$/day or less. When this moisture permeability is high, the moisture absorption of the desiccant in the hygroscopic resin layer 11 is impaired in a short time due to the intrusion of moisture from the atmosphere in the production steps prior to the drying treatment or in a transport step.

The resin for forming the surface protective resin layer 13 is not limited particularly as long as it can maintain moisture permeability as described above. Resins preferably used from the viewpoint of satisfying the moisture permeability in a form of thin layer include olefinic resins used in formation of the hygroscopic resin layer 11 and thermoplastic polyesters such as polyethylene terephthalate (PET), polybutylene terephthalate, and polyethylene naphthalate (PEN). The olefinic resin is used further preferably, and the ethylenic resin or a propylenic resin is most preferred since it has a favorable adhesiveness to the hygroscopic resin layer 11.

By forming the surface protective resin layer 13 using the resin, a predetermined moisture permeability can be satisfied, for instance, with a thickness of 40 μm or less, particularly 30 μm or less.

As will be understood from the above description, in the desiccant sheet 10 used for the drying treatment, the surface protective resin layer 13 prevents moisture intrusion from the atmosphere into the hygroscopic resin layer 11, while the other surface of the hygroscopic resin layer 11 becomes the hygroscopic functional surface 15, so that moisture entering from this surface 15 is captured by the desiccant.

In the present invention, the hygroscopic functional surface 15 of the desiccant sheet 10 is stuck onto the surface of the protective layer C, which is then subjected to a drying treatment and the product is stored, so that the water content in the moisture trapping layer C can be kept in a predetermined range.

The desiccant sheet 10 can be stuck temporality onto the surface of the protective layer C by using the blocking property of the resin forming the hygroscopic functional surface 15. Usually, it is stuck with a pressure-sensitive adhesive in order to reliably prevent inconvenience such as peeling during storage, transport and the like.

When the adhesive is used for sticking to the protective layer C, a pressure-sensitive adhesive layer is formed between the hygroscopic functional surface 15 and the protective layer C. This pressure-sensitive adhesive layer (not shown in FIG. 2) is required not to inhibit the hygroscopic property of the hygroscopic functional surface 15. For this reason, this pressure-sensitive adhesive layer is required to have a moisture permeability higher than that of the above-mentioned surface protective resin layer 13, for instance, a moisture permeability of 40 $g/m^2/day$ or more, particularly 60 $g/m^2/day$ or more at 40° C. and 90% RH.

As the pressure-sensitive adhesive described above, known pressure-sensitive adhesives such as a (meth)acrylic pressure-sensitive adhesive or a urethane-based pressure-sensitive adhesive can be used. A pressure-sensitive adhesive layer having a thickness not more than a predetermined limit (e.g., 30 μm or less) may be formed using any of these pressure-sensitive adhesives so as to maintain moisture permeability as described above.

An ethylene-vinyl acetate (EVA) copolymer, a soft polyolefin (LLDPE), a metallocene polyolefin-based elastomer or the like can also be used as the pressure-sensitive adhesive.

It is preferable in the pressure-sensitive adhesive that the pressure-sensitive adhesive force to the surface of the protective layer C to which the desiccant sheet 10 is stuck is adjusted to be 0.3 N/25 mm or less. By adjusting the adhesive force in this manner, the desiccant sheet 10 can be quickly peeled off without damaging the surface of the protective layer C.

The pressure-sensitive adhesive force can be adjusted by introducing a crosslinked structure into a polymer forming the pressure-sensitive adhesive, or by blending a lubricant or the like into the pressure-sensitive adhesive in accordance with the material of the protective layer C to which the desiccant sheet 10 is to be stuck.

The desiccant sheet 10 can be easily molded by coextrusion using, for instance, a desiccant-containing resin composition for forming the hygroscopic resin layer 11 and a resin for forming the surface protective resin layer 13. When a pressure-sensitive adhesive is used, the pressure-sensitive adhesive is coated by rolling on the surface of the formed hygroscopic resin layer 11. Alternatively, a solvent-containing pressure-sensitive adhesive coating composition is coated. The coated composition is dried suitably. It can also be molded by three-layer coextrusion with a resin used as a pressure-sensitive adhesive.

<Use Embodiment of the Moisture Barrier Laminate 1>

After sticking the desiccant sheet 10 and completing the drying treatment, the moisture barrier laminate film 1 with the desiccant sheet 10 stuck thereon is usually wound around a roll and stored. In other words, the moisture barrier laminate 1 wound around the roll is retained in a state sandwiched between desiccant sheets. Because of this storage condition, moisture absorption of the moisture trapping layer B is effectively prevented, so that the water content of the moisture trapping layer B can be maintained in the aforementioned range.

The moisture barrier laminate 1 is used after the desiccant sheet 10 is peeled off, and at this time, an excellent effect of the present invention is exhibited. In other words, in the moisture barrier laminate 1 of the present invention, the protective resin layer C is provided on the surface of the moisture trapping layer B. Since this protective resin layer C exhibits an appropriate moisture barrier property, increase of the water content of the moisture trapping layer B is prevented over time. For instance, when exposed for 30 seconds, the water content of the moisture trapping layer B is retained in the range described above (0.15 g/g or less, particularly 0.1 g/g or less). That is, within this time period, the moisture trapping layer B is arranged within the device via the protective resin layer C such that the moisture capturing ability by the moisture trapping layer B can be exhibited at the maximum, and the excellent moisture barrier property can be exhibited for a long period of time.

It is also possible to improve the moisture barrier property by laminating another moisture barrier laminate sheet on this moisture barrier laminate 1. Moisture absorption by the moisture trapping layer B during the lamination process can be prevented effectively by the protective resin layer C. In an ordinary operation for the lamination, the desiccant sheet 10 is peeled off and then, the surface of the protective resin layer C is roll-coated with a dry laminate adhesive, such as an acrylic, epoxy or urethane-based adhesive, and a gas barrier film substrate A of another moisture barrier laminate 1 is adhered to the surface coated with the adhesive. By repeatedly performing this lamination operation, a multilayer structure of the moisture barrier laminated sheet 1 can be obtained. The protective resin layer C serves to effectively prevent the moisture absorption of the moisture trapping layer B during such lamination, and an increase in the water content in the moisture trapping layer B is effectively avoided. That is, the moisture absorption by the moisture trapping layer B can be avoided without performing the lamination operation at an extremely fast assembly line speed. This is a major advantage of the present invention.

The method for decreasing the water content of the moisture trapping layer B is not limited to the drying treatment using the desiccant sheet 10, but the method can be vacuum heat-drying or oven baking during the step of coating and forming the trapping layer B. The subsequent increase in water content can be effectively prevented by the protective resin layer C.

The moisture barrier laminate 1 of the present invention can maximally exhibit the moisture barrier property imparted by the moisture trapping layer B. Therefore, it can be used alone as a sealing material. Alternatively, it can be used as a sealing material in the aforementioned form of multilayer structure to be stuck on a device by use of a known pressure-sensitive adhesive or the like so as to effectively avoid intrusion of water into the device and to keep the interior of the device dry, thereby effectively preventing problems such as charge leakage caused by the moisture.

There is no particular limitation on the device, but the device may be organic devices particularly vulnerable to charge leakage caused by moisture. The examples include organic EL devices, solar cells, touch panels, and electronic panels.

Since such a device is required to have high transparency, the device includes a circuit board on which a transparent conductive film is provided. In the case of moisture barrier laminate 1 of the present invention, the aforementioned drying treatment is performed and the desiccant sheet 10 is peeled off, and then, a transparent conductive film can be provided on the surface of the protective resin layer C. A circuit board of the device can be formed using the moisture barrier laminate provided with the transparent conductive film.

For instance, the transparent conductive film may be made of ITO (tin oxide doped indium oxide) or zinc oxide doped with Ga or Al or the like, and it can be provided on the surface of the protective resin layer C by vapor deposition. In other words, even in the step of providing such a transparent conductive film, moisture absorption of the moisture trapping layer B can be effectively prevented in the present invention.

The moisture barrier laminate of the present invention may be mounted on a device that is required to be transparent. In such a case, the protective resin layer C is blended with a metal oxide for adjusting the refractive index, so as to keep a refractive index comparable to the refractive index of the substrate of the device (for instance, the refractive index of the transparent conductive film), thereby effectively avoiding a decrease in light extraction efficiency by the moisture barrier laminate 1.

Here, silica, alumina, titania or zirconia is often used for the metal oxide to adjust the refractive index from the viewpoint of the cost and the like, though there is no particular limitation thereon. The metal oxide blended in the protective resin layer C is usually in the form of fine particles having an average particle size of about 5 nm to about 100 nm (average particle size $D_{50}$ in terms of volume by the laser-diffraction-scattering method). The blend amount is usually about 100 to 400 parts by mass per 100 parts by mass of the resin.

EXAMPLES

The excellent performance of the moisture barrier laminate of the present invention will be described below referring to experimental examples.

<Preparation of Desiccant Sheet>

As the surface protective resin layer, LDPE (SUMIKATHENE manufactured by Sumitomo Chemical Co., Ltd.) was used. This was introduced into an extruder for surface protective resin layer. The hygroscopic resin layer was prepared by using a desiccant and a desiccant dispersion layer. The desiccant used here was a calcium oxide-containing LLDPE master batch (Bell-CML manufactured by Ohmi Chemical Industry Co., Ltd.) and the desiccant dispersion layer was LDPE as a thermoplastic resin (SUMIKATHENE manufactured by Sumitomo Chemical Co., Ltd.). The desiccant and the desiccant dispersion layer were mixed such that the hygroscopic component (here, calcium oxide) would be 25 parts by weight per 75 parts by weight of the resin component.

The material of the hygroscopic resin layer was introduced into an extruder for hygroscopic resin layer. By co-extruding the surface protective resin layer and the hygroscopic resin layer, a film of two layers of "LLDPE (surface protective layer, 15 µm)/CaO-containing LLDPE layer (hygroscopic resin layer, 30 µm)" was shaped.

<Drying Treatment of Moisture Barrier Laminate>

Each of the moisture barrier laminate and the desiccant sheet prepared in Examples and Comparative Examples described below was cut into pieces of 5 cm×5 cm. Then, the moisture barrier laminate and the desiccant sheet were laminated one by one so that the protective resin layer C of the moisture barrier laminate and the hygroscopic resin layer of the desiccant sheet would be in a close contact with each other, which was then sealed in an aluminum bag, degassed, and left standing for seven days in an oven at 70° C. to dry.

<Moisture Content Evaluation 1 of Moisture Barrier Laminate>

The moisture barrier laminates prepared in Examples and Comparative Examples described later were subjected to the drying treatment, and then, the moisture contents of the laminates were measured by a Karl Fischer method ('X' indicates detected moisture amount of the laminate).

As a reference, a laminate having no moisture trapping layer was prepared. After the laminate was subjected to a similar drying treatment, the moisture content of the laminate was measured by a Karl Fischer method ('Y' indicates detected moisture content in the reference).

From the following formula, the water content (A) of each of the moisture trapping layers after the drying treatment was calculated.

$$\text{Moisture content of moisture trapping layer } (A)[g/g] = (X-Y)/Z$$

X: detected moisture content of moisture barrier laminate
Y: detected moisture content of reference
Z: weight of moisture trapping layer In addition, the water content (A) was evaluated as follows.

⊚: less than 0.04 [g/g]
○: 0.04 [g/g] or more and less than 0.1 [g/g]
X: 0.1 [g/g] or more The water content of the moisture trapping layer before the drying treatment was 0.25 [g/g].

<Moisture Content Evaluation 2 of Moisture Barrier Laminate>

The moisture barrier laminates prepared in Examples and Comparative Examples described later were subjected to a drying treatment in the method employed for the moisture content evaluation 1, so that moisture barrier laminates containing a reduced amount of moisture in the moisture trapping layers were produced.

In the meantime, the barrier film laminate was prepared separately, which is a commercially available barrier film having a silicon oxide layer (inorganic barrier layer) (GL-RD manufactured by Toppan Printing Co., Ltd., substrate: PET (12 μm)). PET surfaces of the barrier film were dry-laminated using a urethane-based adhesive 1.8 μm in thickness (A-980/A-19 manufactured by Mitsui Chemicals Inc.). Then, the moisture barrier laminate, from which the desiccant sheet was previously peeled off in an environment of 23° C. 40% RH, was exposed for 30 seconds, then immediately, the barrier film laminate and the surface of the barrier film laminate formed with the moisture trapping layer were dry-laminated via a urethane-based adhesive (A-980/A-19 manufactured by Mitsui Chemicals Inc.), and the adhesive was cured, whereby a multilayer moisture barrier laminate was obtained.

For the obtained laminate, the moisture content was measured by the Karl Fischer method (α denotes a detected moisture content)

As a reference, a multilayer moisture barrier laminate having no moisture trapping layer was prepared, and this was similarly subjected to a measurement of the moisture content by the Karl Fischer method (β denotes a detected moisture content).

From the following formula, the water content (B) of the moisture trapping layer after the drying treatment was calculated.

Moisture content increase in moisture trapping layer
$(B) [g/g] = [(\alpha - \beta)/C] - D$ α: detected moisture content of multilayer moisture barrier laminate
β: detected moisture content of reference
C: weight of the moisture trapping layer
D: water content (A) of the moisture trapping layer calculated by Evaluation 1

The water content (B) was evaluated as follows.
⊚: less than 0.10 [g/g]
○: 0.10 [g/g] or more and less than 0.15 [g/g]
X: 0.15 [g/g] or more <Water Vapor Permeability Measurement>

Water vapor permeability of the moisture barrier multilayer structure was measured in a 60° C. 90% RH environment by using a highly-sensitive water vapor permeability measuring device ("Delta Palm" manufactured by Technolox Ltd.). The time necessary for the barrier property to have a value 10 times the initial value was defined as a "trapping layer performance retention time", and this was evaluated as follows.
○: 1000 hours or more
X: less than 1000 hours <Preparation of Moisture Trapping Layer Coating Liquid (B1) Using Cationic Polymer>

As a cationic polymer, polyallylamine (PAA-15C manufactured by Nittobo Medical Co., Ltd., an aqueous solution product with a solid content of 15%) was diluted with water so as to have a solid content of 5% by weight, whereby a polymer solution was obtained.

Meanwhile, γ-glycidoxypropyltrimethoxysilane was used to prepare a crosslinking agent. This was dissolved in water so as to be 5% by weight, whereby a crosslinking agent solution was obtained.

Then, the polymer solution and the crosslinking agent solution were mixed so that the γ-glycidoxypropyltrimethoxysilane would be 20 parts by weight per 100 parts by weight of polyallylamine, and a crosslinked product of Na polyacrylate (TAFTIC HU-820E manufactured by Toyobo Co., Ltd., an aqueous dispersion with a solid content of 13%) as a moisture absorbent was added to the mixed solution so as to be 420 parts by weight with respect to polyallylamine, and further, the mixture was adjusted with water so that the solid content would be 5% and well stirred, thereby preparing a coating liquid (B1) for a moisture trapping layer.

<Preparation of Moisture Trapping Layer Coating Liquid (B2) Using Anionic Polymer>

Polyacrylic acid (AC-10LP manufactured by Nippon Pure Chemical Industries, Ltd.) was used as an anionic polymer. This was dissolved in a water/acetone mixed solvent (80/20 by weight ratio) so as to have a solid content of 5% by weight. Sodium hydroxide was added thereto so that a neutralization ratio of the polyacrylic acid would be 80%, whereby a polymer solution was obtained.

To this polymer solution, a 1,2-cyclohexanedicarboxylic acid diglycidyl was blended as a crosslinking agent so as to be 20 parts by weight with respect to a polyacrylic acid partial neutralized product. Subsequently, β-(3,4-epoxycyclohexyl) ethyltrimethoxysilane as an adhesion-imparting agent was blended in this polymer solution so as to be 3 parts by weight with respect to a polyacrylic acid partially-neutralized product, and further, a granular moisture absorbent (TAFTIC HU-820E manufactured by Toyobo Co., Ltd., a water dispersed product having a solid content of 13%) was blended to be 431 parts by weight with respect to the polyacrylic acid partially-neutralized product. This was further adjusted with a water/acetone mixed solvent (80/20 by weight ratio) so that the total solid content would be 5% by weight, and then, stirred well to prepare a coating liquid (B2) for a moisture trapping layer.

Example 1

An acrylic resin (ARACOAT DA-105, manufactured by Arakawa Chemical Industries Ltd., solid content: 35%) was prepared as the main polymer liquid.

In this main polymer liquid, polyisocyanate (ARACOAT CL-100A manufactured by Arakawa Chemical Industry Co., Ltd., solid content: 40%) as a curing agent was blended to be 40 parts by weight per 100 parts by weight of solid content of the main polymer solution. This was diluted with 2-butanone to prepare the protective resin layer coating liquid (C) having a solid content of 20%.

A barrier film laminate was prepared by dry-laminating PET surfaces of a commercially available barrier film (GL-RD manufactured by Toppan Printing Co., Ltd. having a substrate of PET (12 μm)) having a silicon oxide layer (inorganic barrier layer) with a urethane-based adhesive 1.8 μm in thickness (A980/A19 manufactured by Mitsui Chemicals Inc.).

On the protective layer (D) of this barrier film laminate, a moisture trapping layer coating liquid (B1) containing the above-mentioned cationic polymer was coated with a bar coater, and heat-treated under the conditions of a peak temperature of 100° C. and a peak temperature retention time of 3 minutes, thereby forming a moisture trapping layer (B) having a thickness of 4 μm, whereby a coating film B was obtained.

Immediately after the formation of the moisture trapping layer, the protective resin layer coating liquid C was coated with a bar coater onto the moisture trapping layer B of the coating film B. The coated film was heat-treated in a box-type electric oven under conditions that the peak temperature was 120° C. and the peak temperature retention time was 10 seconds, thereby forming a protective resin layer C having a thickness of 1 μm, whereby a moisture barrier laminate was obtained.

Example 2

A moisture barrier laminate and a moisture barrier laminate structure were produced in the same manner as in Example 1, except that the thickness of the protective resin layer C was set to 0.5 μm.

Example 3

A moisture barrier laminate and a moisture barrier laminate structure were produced in the same manner as in Example 1, except that the thickness of the protective resin layer C was set to 3.0 μm.

Example 4

A moisture barrier laminate and a moisture barrier laminate structure were produced in the same manner as in Example 1 except that the thickness of the protective resin layer C was set to 15.0 μm.

Example 5

A moisture barrier laminate was prepared in the same manner as in Example 1, except that a moisture trapping layer coating liquid (B2) containing an anionic polymer was used.

Example 6

A moisture barrier laminate was prepared in the same manner as in Example 5, except that the main polymer of the protective resin layer was replaced by a urethane resin (UREARNO 5319 manufactured by Arakawa Chemical Industry Co., Ltd.).

Example 7

A moisture barrier laminate was prepared in the same manner as in Example 1, except that the main polymer for the protective resin layer C was a polyester resin (VYLON 880 manufactured by Toyobo Co., Ltd.), which was dissolved using 2-butanone so that the solid content would be 20% and to which polyisocyanat ("D-110N" manufactured by Mitsui Chemicals Inc., solid content: 75%) as a curing agent was added to be 10 parts by weight with respect to the solid content of the main polymer.

Example 8

Immediately after forming the moisture trapping layer B, a PET film having a thickness of 12 μm (Lumirror manufactured by Toray Industries, Inc.) was dry-laminated on the moisture trapping layer B of the coating film B in Example 1 via a urethane-based adhesive (A980/A19 manufactured by Mitsui Chemicals Inc.) having a thickness of 1.8 μm, whereby a moisture barrier laminate was obtained.

Comparative Example 1

A moisture barrier laminate was prepared in the same manner as in Example 1, except that the protective resin layer C was not provided.

Comparative Example 2

A moisture barrier laminate and a moisture barrier laminate structure were prepared in the same manner as in Example 1, except that the thickness of the protective resin layer C was set to 0.3 μm.

Comparative Example 3

Immediately after forming the moisture trapping layer B, a commercially available barrier film having a thickness of 13 μm (GL film manufactured by Toppan Printing Co., Ltd.) was dry-laminated on the moisture trapping layer B of the coating film B in Example 1 via a urethane-based adhesive (A980/A19 manufactured by Mitsui Chemicals Inc.) having a thickness of 1.8 μm, whereby a moisture barrier laminate was obtained.

Evaluation results for Examples and Comparative Examples are shown in Table 1 below.

TABLE 1-1

| | Moisture trapping layer (thickness [μm]) | Protective resin layer (thickness [μm]) | Moisture permeability of protective layer [g/m²/day] |
|---|---|---|---|
| Example 1 | Cationic (4) | Acrylic resin (1.0) | 21100 |
| Example 2 | Cationic (4) | Acrylic resin (0.5) | 40000 |
| Example 3 | Cationic (4) | Acrylic resin (3.0) | 7040 |
| Example 4 | Cationic (4) | Acrylic resin (15.0) | 1450 |
| Example 5 | Anionic (4) | Acrylic resin (1.0) | 21100 |
| Example 6 | Cationic (4) | Urethane resin (1.0) | 6800 |
| Example 7 | Cationic (4) | Polyester resin (1.0) | 5720 |
| Example 8 | Cationic (4) | PET film (13.8) | 49 |
| Comparative Example 1 | Cationic (4) | None | — |
| Comparative Example 2 | Cationic (4) | Acrylic resin (0.3) | 70400 |
| Comparative Example 3 | Cationic (4) | barrier film (14.8) | 0.7 |

TABLE 1-2

| | Moisture content evaluation 1 Water content (A) [g/g] | | Moisture content evaluation 2 Water content increase (B) [g/g] | | Water vapor permeability measurement Trapping layer performance retention time |
|---|---|---|---|---|---|
| Example 1 | ◎ | 0.025 | ○ | 0.065 | ○ |
| Example 2 | ◎ | 0.01 | ○ | 0.115 | ○ |
| Example 3 | ◎ | 0.034 | ◎ | 0.051 | ○ |
| Example 4 | ○ | 0.08 | ◎ | 0.02 | ○ |
| Example 5 | ◎ | 0.025 | ◎ | 0.065 | ○ |
| Example 6 | ◎ | 0.036 | ◎ | 0.039 | ○ |
| Example 7 | ◎ | 0.038 | ◎ | 0.027 | ○ |
| Example 8 | ○ | 0.095 | ◎ | 0.005 | ○ |
| Comparative Example 1 | ◎ | 0.01 | X | 0.17 | X |
| Comparative Example 2 | ◎ | 0.01 | X | 0.165 | X |
| Comparative Example 3 | X | 0.2 | ◎ | 0 | X |

EXPLANATIONS OF LETTERS OR NUMERALS

1: Moisture barrier laminate
A: Gas barrier film substrate
a1: Inorganic barrier layer
a2: Film substrate layer B: Moisture trapping layer
C: Protective resin layer
9: Organic layer
10: Desiccant sheet
11: Hygroscopic resin layer
13: Surface protective resin layer
15: Hygroscopic functional surface

The invention claimed is:

1. A moisture barrier laminate comprising:
a gas barrier film substrate A as a base having a gas barrier layer;
a moisture trapping layer B formed on the film substrate A;
a protective resin layer C having a moisture permeability in a range of $4.0\times10$ to $5.0\times10^4$ g/m$^2$/day at 40° C. and 90% RH, the protective resin layer C being laminated on a surface of the moisture trapping layer B opposite to the film substrate A; and
a desiccant sheet adhered onto a surface of the protective resin layer C opposite the moisture trapping layer B,
wherein the desiccant sheet is adhered onto the protective resin layer C via an adhesive, and
the adhesive has a moisture permeability higher than that of the protective resin layer C, and exhibits an adhering force of not more than 0.3 N/25 mm to the protective resin layer C.

2. The moisture barrier laminate according to claim 1, wherein the moisture trapping layer B keeps a water content of not more than 0.15 g/g in a measurement at 230° C. in accordance with JIS-7251.

3. The moisture barrier laminate according to claim 1, wherein the moisture trapping layer B contains a hygroscopic polymer.

4. The moisture barrier laminate according to claim 1, wherein the moisture trapping layer B comprises a hygroscopic matrix of an ionic polymer in which a moisture absorbent having an ultimate humidity lower than the ultimate humidity of the matrix is dispersed.

5. The moisture barrier laminate according to claim 1, wherein the ionic polymer contained in the moisture trapping layer B is a cationic polymer.

6. The moisture barrier laminate according to claim 1, wherein the protective resin layer C is formed of an acrylic resin, a urethane resin or a polyester resin.

7. The moisture barrier laminate according to claim 1, wherein the protective resin layer C has a thickness in a range of 0.1 to 15 μm.

8. The moisture barrier laminate according to claim 1, wherein the protective resin layer C comprises a particulate metal oxide blended as a refractive index modifier.

9. The moisture barrier laminate according to claim 8, wherein the metal oxide is silica, alumina, titania or zirconia.

10. The moisture barrier laminate according to claim 8, wherein a transparent conductive film is provided on the protective resin layer C.

11. An electronic device member comprising the moisture barrier laminate according to claim 1.

12. The moisture barrier laminate according to claim 1, wherein the desiccant sheet comprises a hygroscopic resin layer in which a desiccant is dispersed, and a surface protective resin layer; and wherein the hygroscopic resin layer faces the protective resin layer C.

13. The moisture barrier laminate according to claim 1, wherein the desiccant sheet is peelably adhered onto the protective resin layer C.

* * * * *